(12) United States Patent
Kansier et al.

(10) Patent No.: US 6,499,794 B1
(45) Date of Patent: Dec. 31, 2002

(54) SPORT UTILITY SLIDING DOOR

(75) Inventors: Earl E. Kansier, White Lake, MI (US); Joseph E. Mrozowski, Clarkston, MI (US); John P. Pacella, Rochester Hills, MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/715,914

(22) Filed: Nov. 17, 2000

Related U.S. Application Data

(60) Provisional application No. 60/167,402, filed on Nov. 24, 1999.

(51) Int. Cl.[7] ................................................. B60J 5/06
(52) U.S. Cl. ........................... 296/155; 296/64; 296/185
(58) Field of Search ................................. 296/155, 185, 296/64

(56) References Cited

U.S. PATENT DOCUMENTS

| | | | | |
|---|---|---|---|---|
| 2,068,505 A | * | 1/1937 | Morrison | 296/64 |
| 4,337,596 A | * | 7/1982 | Kern et al. | 49/210 |
| 4,932,709 A | * | 6/1990 | Wainwright | 296/65.09 |
| 5,769,480 A | * | 6/1998 | Gebhardt | 296/65.1 |
| 5,927,789 A | * | 7/1999 | Mezzadri et al. | 296/64 |
| 5,967,595 A | * | 10/1999 | Heya et al. | 296/155 |
| 6,089,641 A | * | 7/2000 | Mattarella et al. | 296/64 |
| 6,129,404 A | * | 10/2000 | Mattarella et al. | 296/64 |

* cited by examiner

Primary Examiner—Stephen T. Gordon
Assistant Examiner—Lori L Coletta
(74) Attorney, Agent, or Firm—Harness, Dickey & Pierce, P.L.C.

(57) ABSTRACT

A motor vehicle for transporting passengers includes a body defining a passenger compartment, a first row of seats positioned within the passenger compartment, a second row of seats positioned within the passenger compartment rearward of the first row of seats, and a third row of seats positioned within said passenger compartment rearward of said second row of seats. The second and third rows of seats have seat backs and a seat bottoms. A first door is hingedly coupled to the vehicle for providing access to the first row of seats. A second door is positioned rearward and adjacent to the first door. The second door selectively encloses an opening formed in the body. The opening extends from a point forward of the seat bottom of the second row of seats to a point at least partially exposing the seat bottom of the third row of seats.

11 Claims, 2 Drawing Sheets

SPORT UTILITY SLIDING DOOR

This application claims the benefit of Provisional Application No. 60/167,402 filed Nov. 24, 1999.

BACKGROUND OF THE INVENTION

1. Technical Field

The present invention generally relates to motor vehicles and, more particularly, to a sport utility vehicle equipped with a rear sliding door.

2. Discussion

Sport utility vehicles have become extremely popular in recent times. Much of their success may be attributed to providing consumers with a vehicle combining the desirable aspects of a truck such as high towing capacity and cargo volume and with the characteristics of a passenger car such as vehicle handling. Some of the sport utility vehicles currently offered are large enough to provide a third row of passenger seats thereby increasing the possible number of passengers carried at one time.

Commonly, sport utility vehicles include two or four doors hingedly attached to the vehicle body for providing ingress and egress to the vehicle passenger compartment. However, the rear doors typically do not provide access to the most rearward or third row of seats without manipulating the second row of seats in some way. Specifically, one design requires each of the passengers seated in the second row of seats to exit the vehicle such that the second row of seats or a portion thereof may be articulated forward to clear a path for an entrant to the third row of seats. Obviously, it would be desirable to reduce the amount of effort required to enter and exit the third row of seats provided in a sport utility vehicle. Accordingly, a need exists for a sport utility door which provides simplified access to both the second and third row of passenger seats.

The present invention relates to a motor vehicle for transporting passengers. The motor vehicle includes a body defining a passenger compartment, a first row of seats positioned within the passenger compartment, a second row of seats positioned within the passenger compartment rearward of the first row of seats, and a third row of seats positioned within said passenger compartment rearward of said second row of seats. The second and third rows of seats have seat backs and a seat bottoms. A first door is hingedly coupled to the vehicle for providing access to the first row of seats A second door is positioned rearward and adjacent to the first door. The second door selectively encloses an opening formed in the body. The opening extends from a point forward of the seat bottom of the second row of seats to a point at least partially exposing the seat bottom of the third row of seats.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
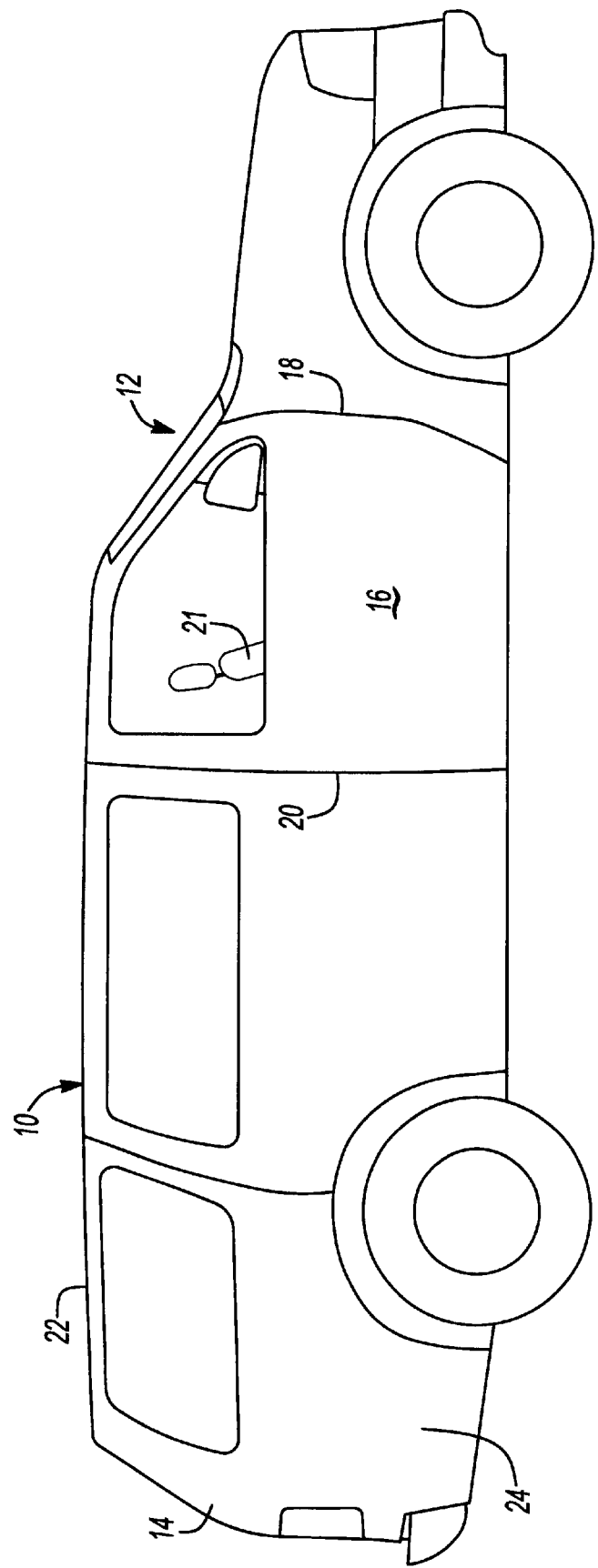
FIG. 1 is a side view of an exemplary vehicle equipped with the sliding door of the present invention.

With reference to the drawings, a rear sliding door constructed in accordance with the teachings of an embodiment of the present invention is generally identified at reference numeral 10. As shown in FIG. 1, the rear sliding door 10 is shown in a closed position operatively associated with an exemplary motor vehicle 12.

The motor vehicle 12 is illustrated to generally include a body 14, two front passenger doors 16 and at least one of the rear sliding doors 10 of the present invention. Each of the front passenger doors 16 includes a first edge 18 and a second edge 20 where the first edge 18 is pivotally coupled to the body 14 via a hinge (not shown). Accordingly, a vehicle operator may gain access to a front row of passenger seats 21 by rotating the front passenger door 16 about its hinge and swinging the front passenger door outwardly from the body 14.

Figure 2:
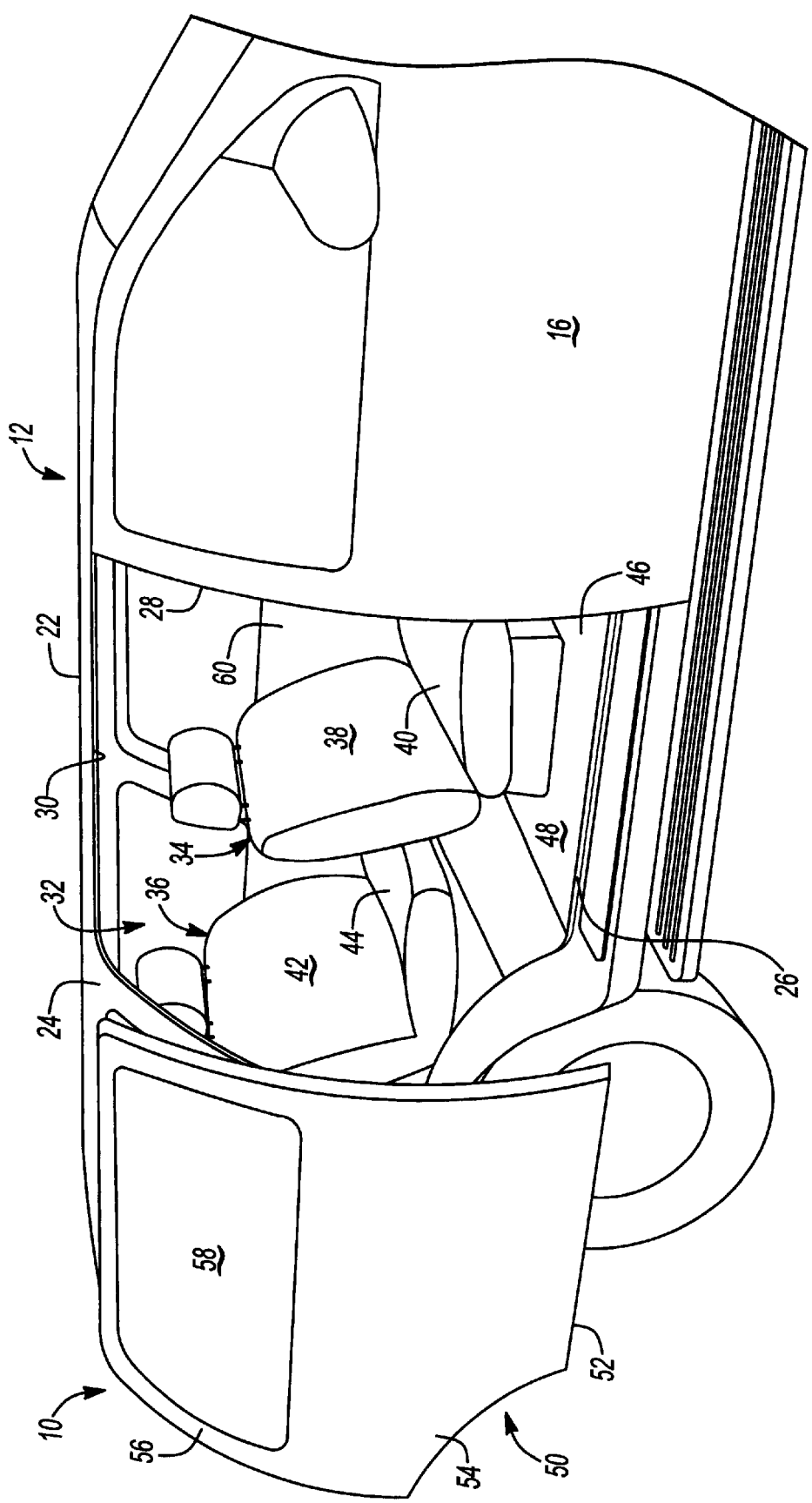
FIG. 2 is a partial view of the vehicle of FIG. 1 depicted with the sliding door in an opened position.

As shown in FIG. 2, the body 14 includes a top 22, a rear quarter panel 24, a floor panel 26, and a B pillar 28 defining an opening 30 for providing access to a passenger compartment 32 of the vehicle 12. The vehicle 12 includes a second row of passenger seats 34 positioned rearward and generally parallel to the first row of passenger seats 21. A third row of passenger seats 36 is positioned rearward of and generally parallel to the second row of passenger seats 34. The second row of seats 34 includes a seat back 38 coupled to a seat bottom 40. In similar fashion, the third row of seats 36 includes a seat back 42 coupled to a seat bottom 44. It should be appreciated that the third row of passenger seats need not face forward as depicted in the drawings but may be rotated 90 or 180 degrees without departing from the scope of the present invention.

One skilled in the art will appreciate that the opening 30 is sized to provide a first passageway 46 and a second passageway 48 for accessing the vehicle's second and third rows of seats. Specifically, the first passageway 46 allows a passenger to enter the passenger compartment 32 and be seated in the second row of seats 34 without displacing any of the seating or interior components once the rear sliding door 10 has been opened. Similarly, the second passageway 48 provides a vehicle occupant unobstructed access to the third row of passenger seats 36. It should be appreciated that the opening 30 cooperates with the second passageway 48 such that an occupant may be seated in the third row of passenger seats 36 without folding the seat back 38 of the second row of seats 34 or displacing the second row of seats in any direction. It should also be appreciated that any occupants currently seated in the second row of seats 34 need not exit the vehicle for additional occupants to be seated in the third row of passenger seats 36. In the preferred embodiment, the opening 30 extends from a point forward of the seat bottom 40 of the second row of seats 34 rearwardly to a point at least partially exposing the seat bottom 44 of the third row of seats. In this manner, a passenger is provided simplified access to both the second and third row of seats 34, and 36 respectively.

The rear sliding door 10 includes a door shell 50 having an inner panel 52 and an outer panel 54 interconnected at their periphery to form a window frame 56 and a hollow cavity (not shown). The rear sliding door 10 also includes a glass panel 58 which may be fixedly coupled to the window frame 56 or pivotally coupled thereto thereby allowing an operator to selectively open and close the glass panel 58 relative to the door shell 50.

The rear sliding door 10 also includes a door actuation mechanism (not shown) preferably mounted within the hollow cavity. The door actuation mechanism includes an inner handle and an outer handle interconnected to a latch for selectively unlatching the rear sliding door 10 from the body 14. In addition, the rear sliding door 10 further includes an interior trim panel 60 for concealing the door actuation mechanism and also providing a door pull (not shown) for assisting a vehicle occupant in sliding the rear door 10 from an open position to a closed position while seated within the passenger compartment 32 of the vehicle 12.

It should be appreciated that a portion of the rear sliding door 10 may extend past the rearward extremity of the body 14. Accordingly, a slider mechanism (not shown) interconnects the door shell 50 and the body 14 such that the rear sliding door 10 may be displaced along the outside of the vehicle body 14 a distance substantially equivalent to the width of the rear sliding door.

Therefore, it should be appreciated that the configuration and operation of the rear sliding door 10 provides operational advantages over the prior art. Specifically, the rear sliding door 10 of the present invention provides occupant access to both the second and third row of passenger seats without displacing vehicle occupants or seat assemblies.

The foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims:

What is claimed is:

1. A motor vehicle for transporting passengers comprising:
    a body defining a passenger compartment, a vehicle floor, and a wheel well, said vehicle floor having a first portion extending forward of said wheel well and a second portion extending rearward of said first portion, said second portion being offset from said first portion;
    a first row of seats positioned within said passenger compartment;
    a second row of seats positioned within said passenger compartment rearward of said first row of seats and coupled to said first portion of said vehicle floor, said second row of seats having a seat back and a seat bottom;
    a third row of seats positioned within said passenger compartment rearward of said second row of seats and coupled to said second portion of said vehicle floor, said third row of seats having a seat back and a seat bottom;
    a first door hingedly coupled to said vehicle for providing access to said first row of seats; and
    a second door positioned rearward and adjacent to said first door, said second door selectively enclosing an opening formed in said body, said opening extending from a point forward of said seat bottom of said second row of seats to a point at least partially exposing said seat bottom of said third row of seats.

2. The motor vehicle of claim 1 wherein said body includes a quarter panel, said second door being positioned adjacent and substantially parallel to said quarter panel when said second door is in an opened position.

3. The motor vehicle of claim 2 wherein said quarter panel includes a rear edge and wherein at least a portion of said second door extends rearward of said quarter panel rear edge when said door is in said opened position.

4. A motor vehicle for transporting passengers comprising:
    a body defining a passenger compartment and a wheel well;
    a first row of seats positioned within said passenger compartment;
    a second row of seats positioned within said passenger compartment adjacent said wheel well and rearward of said first row of seats;
    a first passageway positioned between said first row of seats and said second row of seats, said first passageway providing access to said second row of seats;
    a third row of seats positioned within said passenger compartment adjacent said wheel well and rearward of said second row of seats;
    a second passageway positioned between said second row of seats and said third row of seats, said second passageway providing access to said third row of seats;
    a first door hingedly coupled to said vehicle for providing access to said first row of seats;
    a second door positioned rearward of said first door, said second door selectively enclosing an opening formed in said body, said opening positioned in communication with said first and second passageways, said second door including a leading edge and a trailing edge, wherein said leading edge is positioned rearward of a forward edge of said wheel well when said second door is at an opened position.

5. The motor vehicle of claim 4 wherein each of the first and second passageways are bounded by a substantially flat floorboard.

6. The motor vehicle of claim 4 wherein said second door is configured with a length and a height which are substantially equal.

7. The motor vehicle of claim 1 wherein said second door includes a leading edge and a trailing edge, wherein said leading edge is positioned rearward of a forward edge of said wheel well when said second door is at an opened position.

8. A motor vehicle for transporting passengers comprising:
    a body defining a passenger compartment, a vehicle floor, and a wheel well, said vehicle floor having a first portion extending forward of said wheel well and a second portion extending rearward of said wheel well, said second portion being offset from said first portion;
    a first row of seats positioned within said passenger compartment, said first row of seats coupled to said first portion of said vehicle floor;

a second row of seats positioned within said passenger compartment rearward of said first row of seats and coupled to said second portion of said vehicle floor, said second row of seats having a seat back and a seat bottom;

a first door hingedly coupled to said vehicle for providing access to said passenger compartment; and a second door positioned rearward and adjacent to said first door, said second door selectively enclosing an opening formed in said body, said opening extending from a point rearward of said first door to a point at least partially exposing said seat bottom of said second row of seats.

9. The motor vehicle of claim 8 wherein said body includes a quarter panel, said second door being positioned adjacent and substantially parallel to said quarter panel when said second door is in an opened position.

10. The motor vehicle of claim 9 wherein said quarter panel includes a rear edge and wherein at least a portion of said second door extends rearward of said quarter panel rear edge when said door is in said opened position.

11. The motor vehicle of claim 8 wherein said second door includes a leading edge and a trailing edge, wherein said leading edge is positioned rearward of a forward edge of said wheel well when said second door is at an opened position.

\* \* \* \* \*